(12) United States Patent
Sanders et al.

(10) Patent No.: US 10,367,707 B2
(45) Date of Patent: Jul. 30, 2019

(54) DIAGNOSING CAUSES OF APPLICATION LAYER INTERRUPTIONS IN PACKET-SWITCHED VOICE APPLICATIONS

(71) Applicants: Alcatel-Lucent USA Inc., Murray Hill, NJ (US); Alcatel-Lucent Japan Ltd., Tokyo (JP)

(72) Inventors: Susan W. Sanders, Bridgewater, NJ (US); Kazutaka Murakami, Tokyo (JP); Larry Hsiao Chang, Madison, NJ (US); Girish P. Chandranmenon, Edison, NJ (US); Scott C. Miller, Freehold, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 278 days.

(21) Appl. No.: 15/361,331

(22) Filed: Nov. 25, 2016

(65) Prior Publication Data

US 2018/0152362 A1 May 31, 2018

(51) Int. Cl.
*H04L 12/26* (2006.01)
*H04L 29/08* (2006.01)
*H04M 7/00* (2006.01)
*H04L 29/06* (2006.01)

(52) U.S. Cl.
CPC .............. *H04L 43/08* (2013.01); *H04L 43/04* (2013.01); *H04L 43/06* (2013.01); *H04L 43/0811* (2013.01); *H04L 43/16* (2013.01); *H04L 65/80* (2013.01); *H04L 67/148* (2013.01); *H04L 69/329* (2013.01); *H04M 7/006* (2013.01);

(Continued)

(58) Field of Classification Search
CPC ........ H04L 43/08; H04L 43/16; H04L 67/148; H04L 65/80; H04L 43/04; H04L 43/06; H04L 43/0811; H04L 69/329; H04L 65/1016; H04L 65/102; H04M 7/006
See application file for complete search history.

(56) References Cited

U.S. PATENT DOCUMENTS

2010/0329145 A1\* 12/2010 Bu .................. H04L 43/026
370/253
2012/0316868 A1\* 12/2012 Singh .................. G10L 15/1822
704/201

(Continued)

OTHER PUBLICATIONS

International Search Report and Written Opinion for PCT/US2017/060289, dated Jan. 3, 3018, 9 pages.

*Primary Examiner* — Brian D Nguyen

(57) ABSTRACT

An application layer monitoring module is configured to monitor application layer packets for a call supported by a voice application and to detect an interruption in the call based on the application layer packets. A signaling layer monitoring module is configured to monitor signaling layer events associated with the voice application concurrently with monitoring of the application layer packets for the call. A correlation module is configured to correlate the interruption with the signaling layer events in response to the application layer monitoring module detecting the interruption. The correlation module is also configured to generate a key performance indicator (KPI) message including information indicating the interruption and at least one signaling layer event that is correlated with the interruption.

20 Claims, 12 Drawing Sheets

(52) U.S. Cl.
CPC ........ *H04L 65/102* (2013.01); *H04L 65/1016* (2013.01)

(56) References Cited

U.S. PATENT DOCUMENTS

| | | | |
|---|---|---|---|
| 2015/0318940 A1* | 11/2015 | Bugenhagen | H04J 3/0632 370/509 |
| 2016/0050686 A1* | 2/2016 | Krishnamoorthi | H04W 72/042 455/418 |
| 2016/0277952 A1* | 9/2016 | Hui | H04W 24/08 |

\* cited by examiner

| S11 Rec | Request_t | Response_t | Msg Type | | | | | | |
|---|---|---|---|---|---|---|---|---|---|
| RTP Rec | firstMedia_t | lastMedia_t | up Ho Int Time (ms) | dn Ho Int Time (ms) | UP RTP Loss | DN RTP Loss | UP Int Event | DN Int Event | BS |
| RTP | 6/15/16  06:07:26.233 | 6/15/16  06:07:58.913 | 0 | 0 | 0.0% | 0.0% | 0 | 0 | 710 |
| RTP | 6/15/16  06:07:59.055 | 6/15/16  06:08:59.193 | 208 | 158 | 0.3% | 0.0% | 0 | 0 | 711 |
| RTP | 6/15/16  06:08:59.213 | 6/15/16  06:09:28.790 | 46 | 20 | 2.1% | 0.0% | 0 | 0 | 712 |
| S11 | 6/15/16  06:09:28.789 | 6/15/16  06:09:28.793 | | | AccessBearerRelease | | | | 712 |
| S11 | 6/15/16  06:09:28.855 | 6/15/16  06:09:28.861 | | | DLDataNotify | | | | 712 |
| S11 | 6/15/16  06:09:31.729 | 6/15/16  06:09:31.755 | | | BearerModify | | | | 713 |
| RTP | 6/15/16  06:09:31.792 | 6/15/16  06:09:35.392 | 3874 | 3001 | 51.7% | 27.4% | 1 | 1 | 713 |

| | Msg Type | | | | | | |
|---|---|---|---|---|---|---|---|
| S11 Rec | Request_t | Response_t | | | | | BS |
| RTP Rec | firstUpMediaTs | firstDnMediaTs | lastUpMediaTs | lastDnMediaTs | up Ho Int Time (ms) | dn Ho Int Time (ms) | BS |
| RTP | 6/15/16 07:34:37.495 | 6/15/16 07:34:37.661 | 6/15/16 07:34:38.989 | 6/15/16 07:34:41.300 | 0 | 0 | 1110 |
| S11 | 6/15/16 07:34:41.336 | 6/15/16 07:34:41.362 | BearerModify | | | | 1115 |
| RTP | 6/15/16 07:34:41.597 | 6/15/16 07:34:41.441 | 6/15/16 07:34:41.723 | 6/15/16 07:34:41.801 | 2609 | 141 | 1115 |

DIAGNOSING CAUSES OF APPLICATION LAYER INTERRUPTIONS IN PACKET-SWITCHED VOICE APPLICATIONS

BACKGROUND

Service providers offer packet-switched voice applications such as voice over Internet Protocol (VoIP) that allow users to place and receive calls over a wireless communication network such as a network that operates according to the Long Term Evolution (LTE) standards. For example, voice over LTE (VoLTE) is a VoIP application provided by service providers using an Internet Multimedia Subsystem (IMS) core network within an LTE network. The voice quality perceived by users is one of the key performance indicators (KPIs) used to assess the performance of VoLTE applications. Users are able to detect audio interruptions of more than approximately a half second. An absence of audio or an audio interruption that lasts for less than a half of a second has little or no impact on the perceived voice quality. However, an absence of audio or an audio interruption that lasts for more than a half second degrades the perceived voice quality. Application layer monitoring tools are able to detect audio interruptions for packet-switched voice applications such as VoLTE, but the application layer monitoring tools lack the ability to diagnose the fundamental causes of the interruptions. Drive testing, collection of trace information, and the like can be used to identify some sources of call interruption, but these methods are time-consuming and are not able to identify the causes if the interruptions do not occur during the drive test or trace collection interval.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 12 illustrates RTP packet data and S11 signaling layer events that occur in the wireless communication system shown in FIG. 11 according to some embodiments.

DETAILED DESCRIPTION

The cause of an interruption during voice communication supported by packet-switched voice applications can be effectively diagnosed in real-time by monitoring application layer packets for a call supported by a voice application concurrently with monitoring signaling layer events associated with the voice application. If an interruption is detected by monitoring the application layer packets, signaling layer events are correlated with the interruption. One or more signaling layer events are selected in response to a value representing the interruption exceeding a threshold. An application layer monitoring module generates a message identifying the detected interruption. In some embodiments, detecting the interruption includes detecting a call drop or no audio being provided for at least a threshold time interval.

Signaling layer events that are monitored and correlated with the interruption include release of radio bearers used to convey application layer packets for the voice application, modification or reestablishment of the radio bearers, handoff preparation for the call, path switching between two cells, handoff completion, and the like. The signaling layer events are monitored on signal interfaces such as a signaling interface between a base station and a mobility management entity (MME), and a signaling interface between the MME and a gateway such as a serving gateway. In some embodiments, the message identifying the detected interruption and the correlated signaling layer events is provided to an analysis module, which is configured to generate action plans for service providers that identify corrective actions. The corrective actions include actions to improve user experience at the network level, actions that can be applied to different device types, actions that can enhance the experience of high-priority subscribers, and the like.

Figure 1:
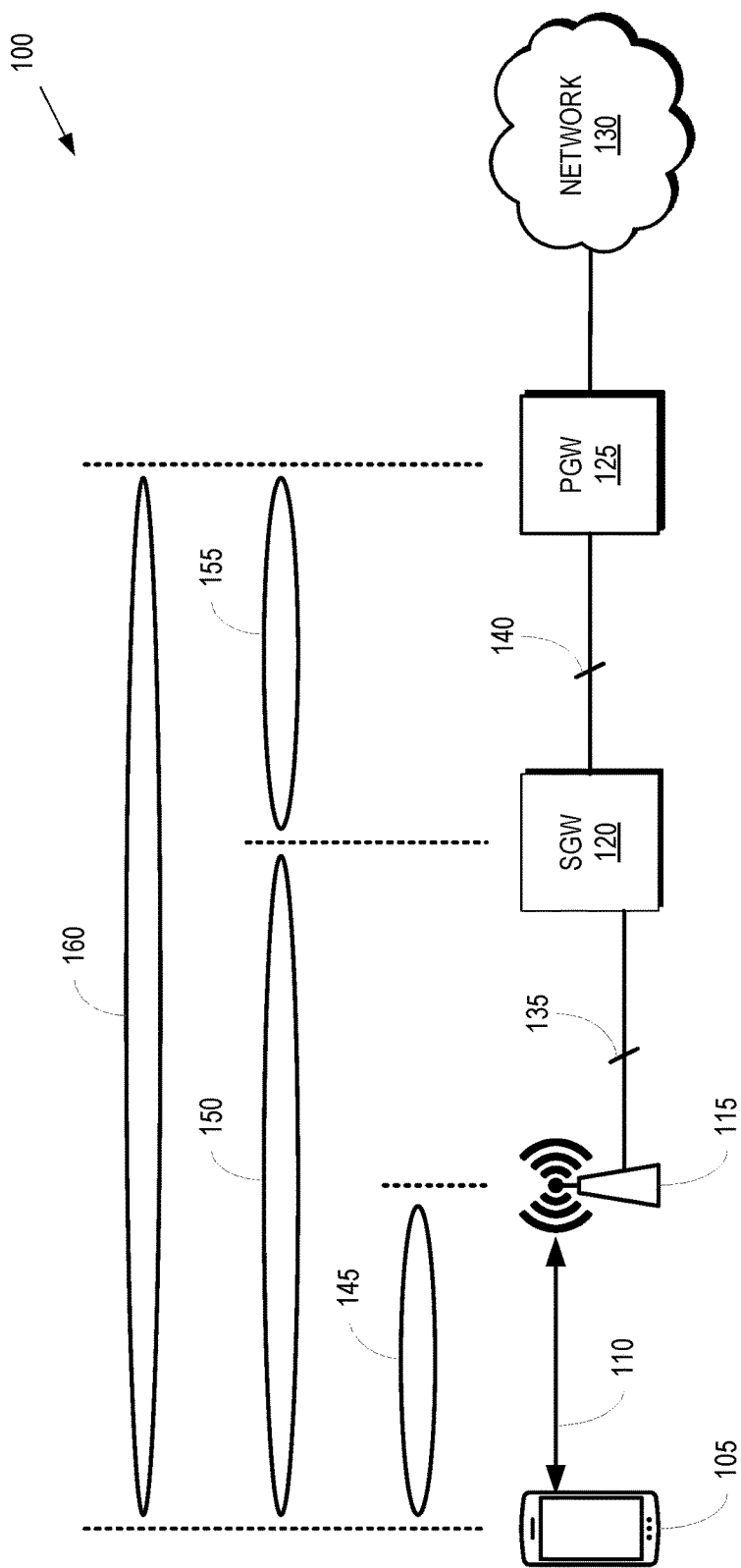
FIG. 1 is a block diagram of a wireless communication system according to some embodiments.

FIG. 1 is a block diagram of a wireless communication system 100 according to some embodiments. The wireless communication system 100 implements an Internet Protocol (IP) packet-switched network that is used to convey packets of information between different user equipment such as the user equipment 105. Examples of user equipment 105 include cell phones, smart phones, tablets, laptop computers, and other wireless-enabled devices. User equipment 105 access the wireless communication system 100 over an air interface 110 that is terminated at a base station 115, which can also be referred to as an eNodeB, an access point, a cell, or using other terms of art for nodes that terminate air interfaces with the user equipment 105. Some embodiments of the user equipment 105 and the base station 115 operate according to the Long Term Evolution (LTE) standards defined by the Third Generation Partnership Project (3GPP).

Some embodiments of the wireless communication system 100 implement a serving gateway (SGW) 120 and a packet data network (PDN) gateway (PGW) 125. The serving gateway 120 routes and forwards user data packets and acts as a mobility anchor for the user plane during handovers between the base station 115 and other base stations. The serving gateway 120 also terminates the downlink data path when the user equipment 105 is in an idle state and triggers paging of the user equipment 105 in response to downlink data arriving for the user equipment 105 while it is in the idle state. The serving gateway 120 is also configured to store context information for the user equipment 105 such as parameters that define IP radio bearers, network routing information, and the like. The PDN gateway 125 provides connectivity between the user equipment 105 and an external packet data network 130. The serving gateway 120 is connected to the base station 115 by a packet interface 135 such as an S1-U packet interface and the serving gateway 120 is connected to the PDN gateway 125 by a packet interface 140 such as an S5/S8 interface. In some embodiments, the serving gateway 120 and the PDN gateway 125 are part of the Evolved Packet Core in the wireless communication system 100.

The interfaces 110, 135, 140 are used to support bearers (such as EPS bearers) that provide connection segments between nodes in the wireless communication system 100. The EPS bearers are defined by a set of characteristics that specify configuration of a physical layer and a data link layer in the terminating nodes. The EPS bearers also define channels between the data link layer and higher layers for transfer of user or control data. The user equipment 105 and the base station 115 are terminating endpoints of a radio bearer 145 that utilizes the air interface 110. The radio bearer 145 is defined by characteristics stored in the user equipment 105 and the base station 115. The user equipment 105 and the serving gateway 120 are terminating endpoints of a radio access bearer 150 (such as E-RAB) that utilizes the packet interface 135 (such as S1 bearer). The radio access bearer 150 is defined by characteristics stored in the user equipment 105 and the serving gateway 120. The serving gateway 120 and the PDN gateway 125 are terminating endpoints of a S5/S8 bearer 155 that utilizes the packet interface 140. The S5/S8 bearer 155 is defined by characteristics stored in the serving gateway 120 and the PDN gateway 125.

The set of EPS bearers 145, 150, 155 are used to support packet-switched voice applications such as a VoLTE application 160 in the wireless communication system 100. A disconnect or disruption of one or more of the EPS bearers 145, 150, 155 can cause an interruption in a call supported by the VoLTE application 160. For example, a call drop can occur due to release of the radio access bearer 150 and a delay in re-establishing the radio access bearer 150. For another example, an interruption in the audio for more than a threshold time interval can also occur because of release and failure to re-establish the radio access bearer 150. The cause of the call drop or audio interruption can therefore be classified as "Release Access Bearer." Similar interruptions can occur due to disconnection or disruption of the radio bearers 145.

Mobility-related events such as hand off of the user equipment 105 can also cause call drops or audio interruptions for call supported by the VoLTE application 160. For example, a call drop can occur if the call is handed off to the wrong cell. For another example, a call drop or audio interruption can occur in response to the duration of a handoff exceeding a threshold value. The duration of the handoff can be determined based on signaling layer events such as modification of one or more of the radio (access) bearers 145, 150, a handoff preparation event, a handoff completion event, and the like. Interference or other conditions in the radiofrequency environment can also cause call drops or audio interruptions even in cases where the EPS bearers 145, 150, 155 are not disconnected and no mobility-related events have occurred. Radiofrequency (RF) layer measurements such as cell traces and per-call measurement data (PCMD) can therefore be used to diagnose the causes of application layer events such as call drops or audio interruptions.

As discussed herein, packet-switched applications are able to detect interruptions (such as no audio or an audio interruption) by monitoring packets at the application layer. Some embodiments of the wireless communication system 100 are able to diagnose causes of the interruptions by concurrently monitoring application layer packets for a call supported by the voice application 160 and signaling layer events associated with the voice application 160. In response to detecting an interruption in the call based on the application layer packets, the wireless communication system 100 correlates the interruption with the signaling layer events and generates one or more key performance indicator (KPI) messages that include information indicating the interruption and one or more signaling layer events that are correlated with the interruption. For example, detecting a correlation between application layer events such as call drops or audio interruptions and a signaling layer event such as release of one or more EPS bearers 145, 150, 155 can result in generation of an actionable KPI message that indicates the application layer event and the signaling layer event.

Figure 2:
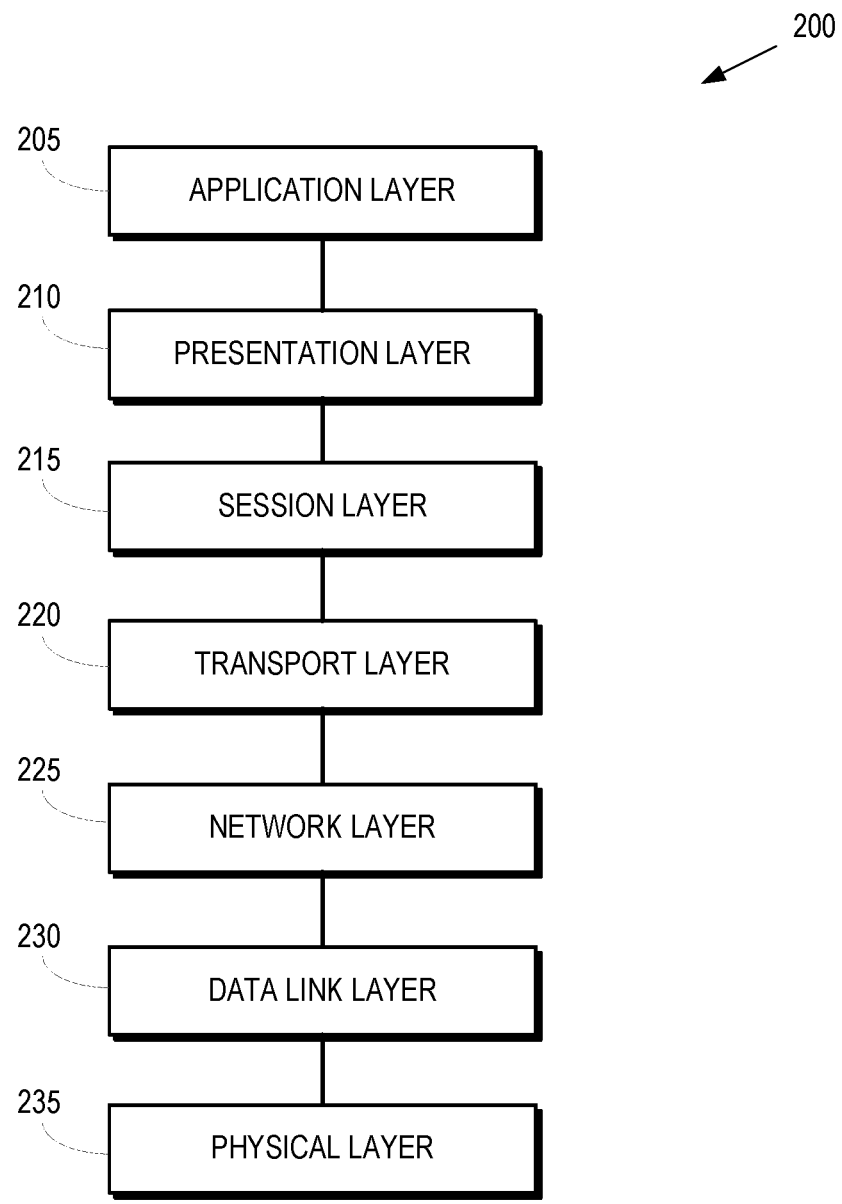
FIG. 2 is a block diagram illustrating structure of the layers that are used to implement nodes in a wireless communication system such as the wireless communication system shown in FIG. 1 according to some embodiments.

FIG. 2 is a block diagram illustrating structure 200 of the layers that are used to implement nodes in a wireless communication system such as the wireless communication system 100 shown in FIG. 1 according to some embodiments. Nodes of the wireless communication system include the user equipment 105, the base station 115, the serving gateway 120, or the PDN gateway 125 in the wireless communication system 100 shown in FIG. 1. The functional layers in the structure 200 are defined according to the Open System Interconnection (OSI) model. An application layer 205 interacts with software applications and is configured to identify communication partners, determine resource availability, and synchronize communication. As discussed herein, monitoring of packets to detect interruptions in voice applications is performed at the application layer 205. A presentation layer 210 establishes a context between application layers of nodes in the wireless communication system. A session layer 215 establishes, manages, and terminates connections between applications in the different nodes of the wireless communication system. A transport layer 220 provides the functional and procedural means for transferring variable-length data sequences from a source to a destination, e.g., from a base station to a serving gateway, or vice versa. A network layer 225 provides functional and procedural means of transferring the variable-length data sequences from one node to another node that is connected to the same network, e.g., using logical network addresses for the nodes. A data link layer 230 supports node-to-node data transfer and may also perform error correction. A physical layer 235 defines the electrical and physical specifications of the data connections between the nodes in the wireless communication system. The physical layer also defines a protocol to establish and terminate the physical connections between the nodes in the wireless indication system. Signaling layer events are detected at the data link layer 230 or the physical layer 235.

Figure 3:
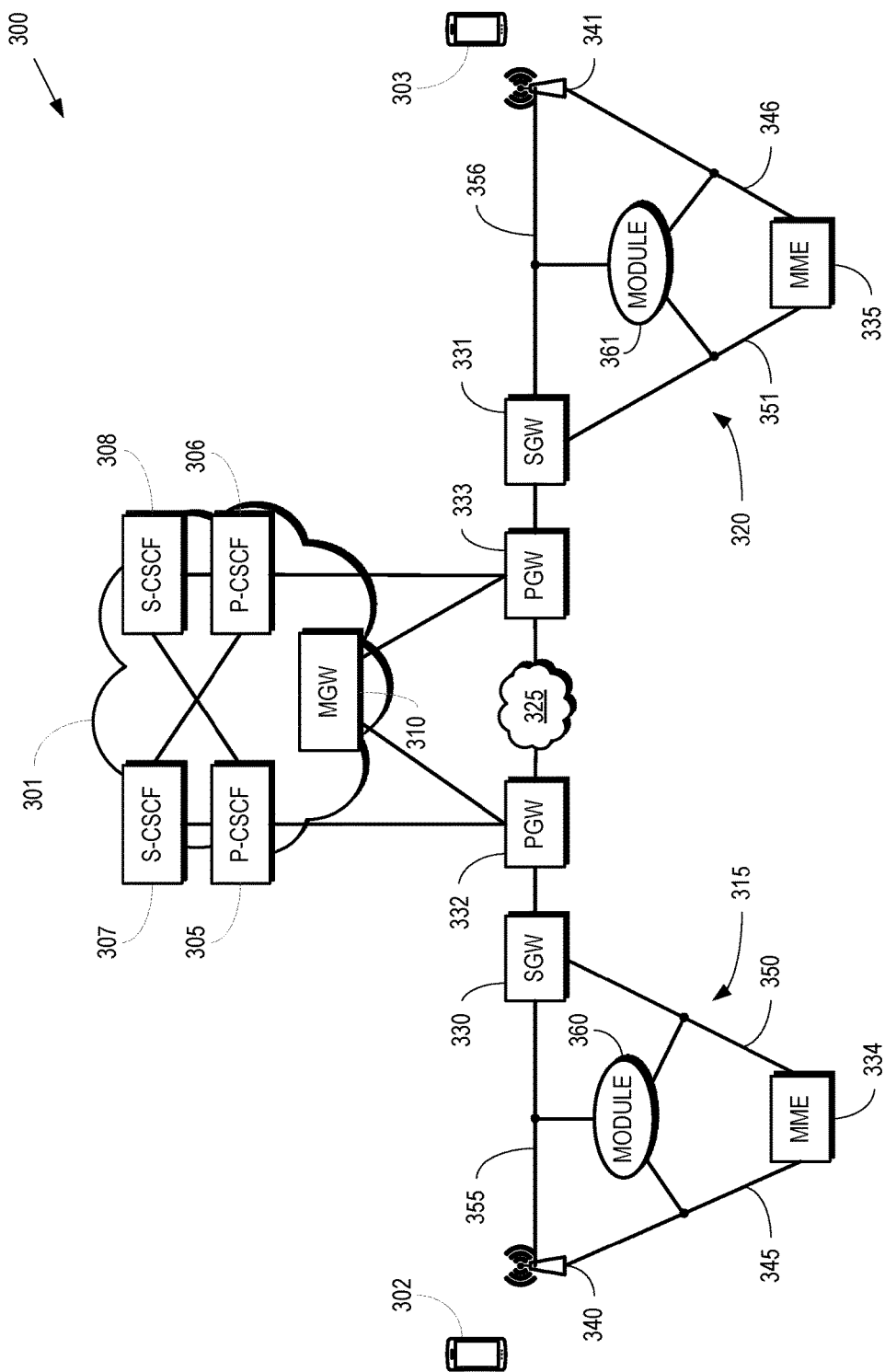
FIG. 3 is a block diagram of a wireless communication system that includes an IP Multimedia Subsystem (IMS) core network to support voice applications for user equipment according to some embodiments.

FIG. 3 is a block diagram of a wireless communication system 300 that includes an IP Multimedia Subsystem (IMS)

core network 301 to support voice applications for user equipment 302, 303 according to some embodiments. The IMS core network 301 includes call session control functions (CSCFs) including one or more proxy CSCFs (P-CSCFs) 305, 306 and one or more serving CSCFs (S-CSCFs) 307, 308. The P-CSCFs 305, 306 are Session Initiation Protocol (SIP) proxies that provide a first point of contact for the user equipment 302, 303. The P-CSCFs 305, 306 are assigned to the corresponding user equipment 302, 303 using a registration process that can be performed at attach and subsequently provides subscriber authentication, security, and other functions for the registered user equipment 302, 303. The S-CSCFs 307, 308 are implemented as SIP servers and are the central nodes of the signaling plane for the user equipment 302, 303. The S-CSCFs 307, 308 handle SIP registrations, bind the IP address of the user equipment 302, 303 to the SIP addresses, perform routing services, enforce policies, and provide other functionality. The IMS core network 301 also includes a media gateway (MGW) 310 that interfaces with a media plane of a circuit-switched network and is able to perform transcoding if needed.

The wireless communication system 300 includes two evolved packet core (EPC) networks 315, 320 that are interconnected by a network 325. The EPC networks 315, 320 include respective serving gateways 330, 331, PDN gateways 332, 333, and mobility management entities (MMES) 334, 335. The mobility management entities 334, 335 are responsible for implementing mobility functions for the user equipment 302, 303, supporting paging of the user equipment 302, 303, reset functionality, non-access stratum (NAS) signaling transport, and the like. The mobility management entities 334, 335 are connected to corresponding base stations 340, 341 by signaling interfaces 345, 346, which can be implemented as S1 interfaces that operate according to protocols including IP, a stream control transmission protocol (SCTP) to support datagram delivery, and an S1 Application Part (S1AP) protocol to support signaling. The mobility management entities 334, 335 are connected to corresponding serving gateways 330, 331 by signaling interfaces 350, 351, which can be implemented as S11 interfaces. As discussed herein, the serving gateways 330, 331 are connected to the base stations 340, 341 by packet interfaces 355, 356, which can be implemented as S1-U interfaces.

Monitoring modules 360, 361 monitor packets at the application layer and signaling layer events at the signaling layer. For example, the monitoring modules 360, 361 can monitor packets transmitted over the packet interfaces 355, 356 and detect call drops or audio interruptions based on the monitored packets at the application layer. For another example, the monitoring modules 360, 361 can monitor signaling transmitted over the interfaces 345, 346, 350, 351 to detect signaling layer events such as radio bearer events, events related to hand off of the user equipment 302, 303, and the like. The monitoring modules 360, 361 are also configured to acquire cell trace information, PCMD, and other information collected by the nodes in the wireless communication system 300. Some embodiments of the monitoring modules 360, 361 include an application layer monitoring module, a signaling layer monitoring module, and a correlation monitoring module.

Figure 4:
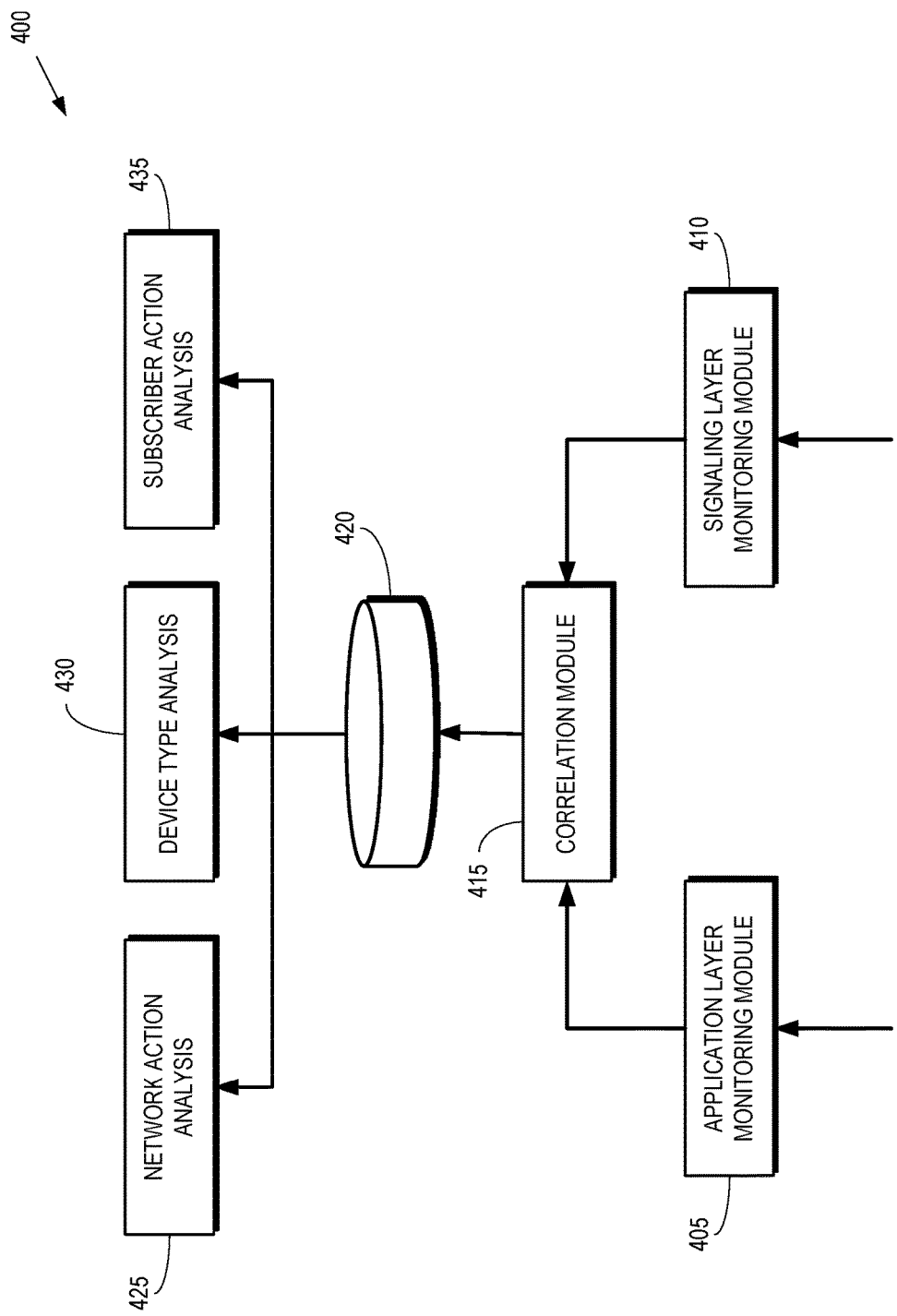
FIG. 4 is a block diagram of a monitoring and analysis system for generating actionable key performance indicators (KPIs) according to some embodiments.

FIG. 4 is a block diagram of a monitoring and analysis system 400 for generating actionable KPIs according to some embodiments. The monitoring and analysis system 400 is implemented in some embodiments of the wireless communication system 100 shown in FIG. 1 and the wireless communication system 300 shown in FIG. 3. For example, the monitoring and analysis system 400 can be implemented in the monitoring modules 360, 361 shown in FIG. 3. The monitoring and analysis system 400 shown in FIG. 4 performs monitoring associated with packet-switched applications such as VoLTE applications. However, some embodiments of the monitoring and analysis system 400 are configured to monitor other packet-switched media applications including audio, video, or multimedia applications.

The monitoring and analysis system 400 includes an application layer monitoring module 405 that monitors application layer packets that are transmitted over packet interfaces. Some embodiments of the application layer monitoring module 405 monitor packets transmitted over an S1-U interface between a base station and a serving gateway, an S5-U interface between a serving gateway and a PDN gateway, an S8-U interface between a serving gateway and a PDN gateway, an S2b interface between a PDN gateway and ePDG and the like. For example, the application layer monitoring module 405 can monitor information obtained by observing SIP signaling, packets that are transmitted according to the real-time transport protocol (RTP), packets that are transmitted according to the RTP control protocol (RTCP), and the like. The RTP packets include audio, video, or other media information. The RTCP packets include statistics and control information for an RTP session.

The monitoring and analysis system 400 also includes a signaling layer monitoring module 410 that monitors signaling layer events indicated by signaling transmitted over signaling interfaces. Some embodiments of the signaling layer monitoring module 410 monitor signaling transmitted over an S1 interface between a base station and a mobility management entity, an S11 interface between a mobility management entity and a serving gateway, an S5 or S8 interface between a serving gateway and a PDN gateway, an S2b interface between a PDN gateway and ePDG, and the like. The signaling layer monitoring module 410 can also be configured to monitor cell trace information and collect PCMD records.

A correlation module 415 receives information indicating dropped calls or audio interruptions that are detected by the application layer monitoring module 405 and information indicating signaling layer events detected by the signaling layer monitoring module 410. The correlation module 415 can correlate the dropped calls or audio interruptions with signaling layer events. For example, the correlation module 415 can determine a time of a dropped call or a beginning time of audio interruption and an ending time of the audio interruption based on packets transmitted over corresponding packet interfaces. The correlation module 415 can then correlate the time of the dropped call, or the beginning time, the ending time, or the time interval of the audio interruption with signaling layer events based on the occurrence time of the signaling layer events. For example, the correlation module 415 determines that a dropped call or audio interruption is correlated with a radio access bearer release event if the radio bearer release event occurs within a predetermined interval before or after the beginning time of the dropped call or audio interruption. For another example, the correlation module 415 determines that the audio interruption is correlated with the release of the radio bearer if a subsequent reestablishment of the radio bearer occurs within a predetermined time interval before or after the ending time of audio event. In some embodiments, correlations are represented by correlation values that are determined using a cross-correlation function and then the correlation values are compared to a threshold to determine whether application layer events are correlated with signaling layer events.

The correlation module 415 generates actionable KPI messages based on the determined correlations between dropped calls or audio interruptions and signaling layer events. The actionable KPI messages include information identifying the interruption detected by monitoring packets at the application layer and information identifying one or more signaling layer events that are correlated with the interruption. If the correlation module 415 is not able to detect a correlated signaling layer event, a non-actionable KPI message is generated. The KPI messages generated by the correlation module 415 are provided to a data storage module 420 for storage.

Upper layer analysis modules access the actionable KPI messages from the data storage module 420 and use this information to generate recommended action plans that are provided to service providers. For example, a network action analysis module 425 can use information in the actionable KPI messages to identify corrective actions that can be applied at the network level to improve the experience of users of the VoLTE application. For another example, a device type analysis module 430 can use the information in the actionable KPI messages to identify different corrective actions associated with different device types. For yet another example, a subscriber action analysis module 435 can use the information in the actionable KPI messages to identify corrective actions that can improve the experience of a subset of the subscribers such as a subset of subscribers that have been identified as high priority or VIP subscribers.

Figure 5:
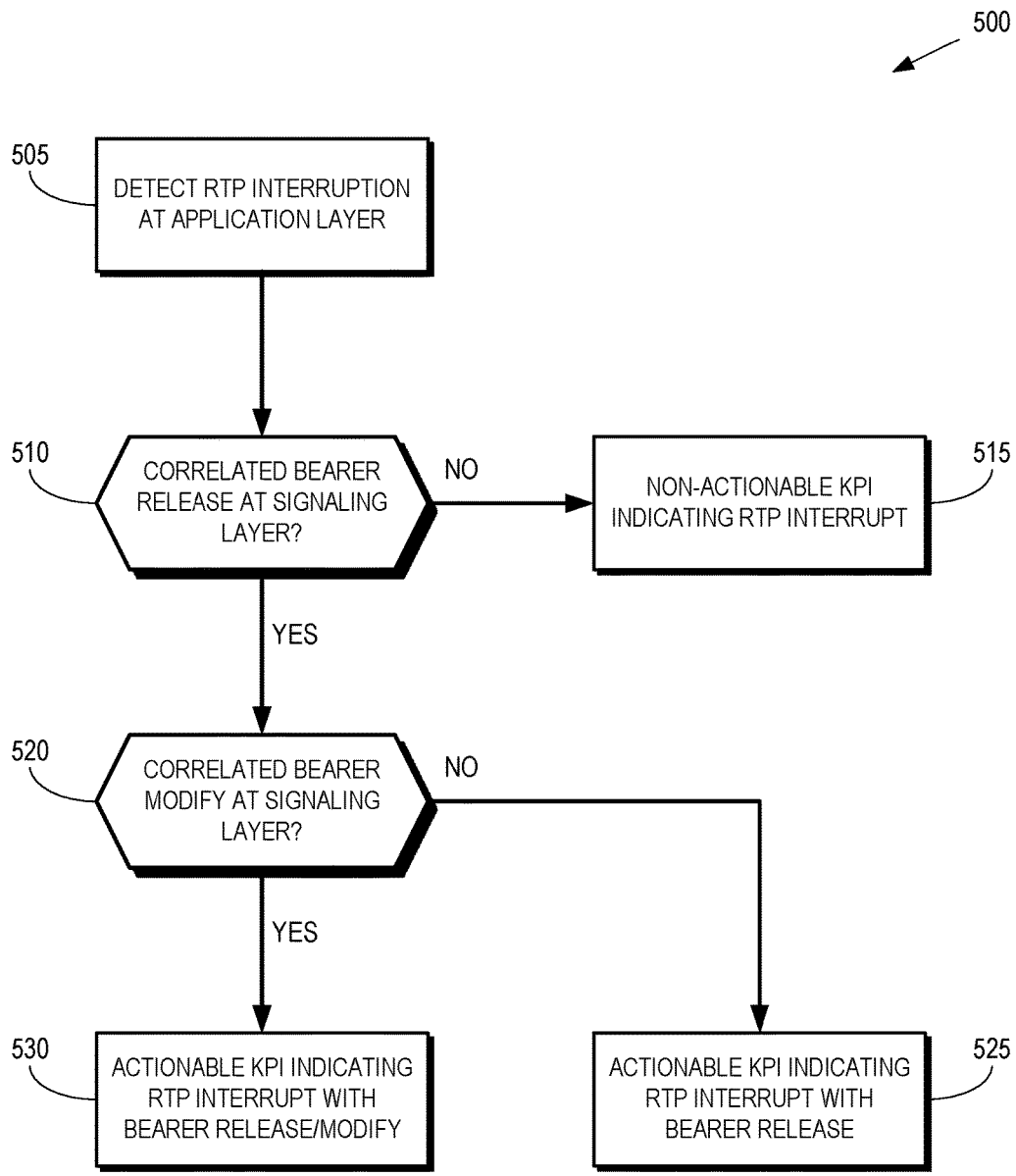
FIG. 5 is a flow diagram of a method for generating actionable KPIs based on application layer interruptions and correlated radio bearer release events according to some embodiments.

FIG. 5 is a flow diagram of a method 500 for generating actionable KPIs based on application layer interruptions and correlated bearer release events according to some embodiments. The method 500 is implemented in some embodiments of the correlation module 415 shown in FIG. 4.

At block 505, an application layer monitoring module in the correlation module detects an interruption in a call that operates according to RTP. The interruption can be a call drop or the absence of audio for a time interval greater than a threshold time interval. The correlation module then correlates the detected interruption with signaling events that are monitored by a signaling layer monitoring module.

At decision block 510, the correlation module determines whether a radio bearer release for the call is correlated with the application layer interruption. The radio bearer release event can be an S11 release access bearer event or a S1-AP UE context release event. If not, the method 500 flows to block 515 and the correlation module generates a non-actionable KPI message that indicates the RTP interruption detected by the application layer monitoring module. The non-actionable KPI message does not include information indicating any signaling layer events. If the correlation module determines that a radio bearer release is correlated with the application layer interruption, the method flows to decision block 520.

At decision block 520, the correlation module determines whether a radio bearer modify event for the call is correlated with the application layer interruption. The radio bearer modify event can be an S11 radio bearer modify event or an S1-AP service request. For example, the correlation module can determine whether a radio bearer modify event that is used to reestablish a radio bearer for the call is correlated with the application layer interruption. If not, the method flows to block 525 and the correlation module generates an actionable KPI message that includes information indicating the RTP interruption and information identifying the correlated radio bearer release. If so, the method flows to block 530 and the correlation module generates an actionable KPI message that includes information indicating the RTP interruption and information identifying the correlated radio bearer release and modification events.

The actionable KPI message generated by the correlation module includes fields for information that identify the RTP interruption, the radio bearer release event, and (if detected) the radio bearer modification event. For example, the actionable KPI message can include fields identifying user equipment involved in the call, a timestamp indicating the start of the RTP interruption event, information identifying a base station serving the user equipment at the beginning of the RTP interruption event, a timestamp indicating a time of release of the radio bearer, a timestamp indicating the end of the RTP interruption event, information identifying a base station serving the user equipment at the end of the RTP interruption event, and the like.

Figure 6:
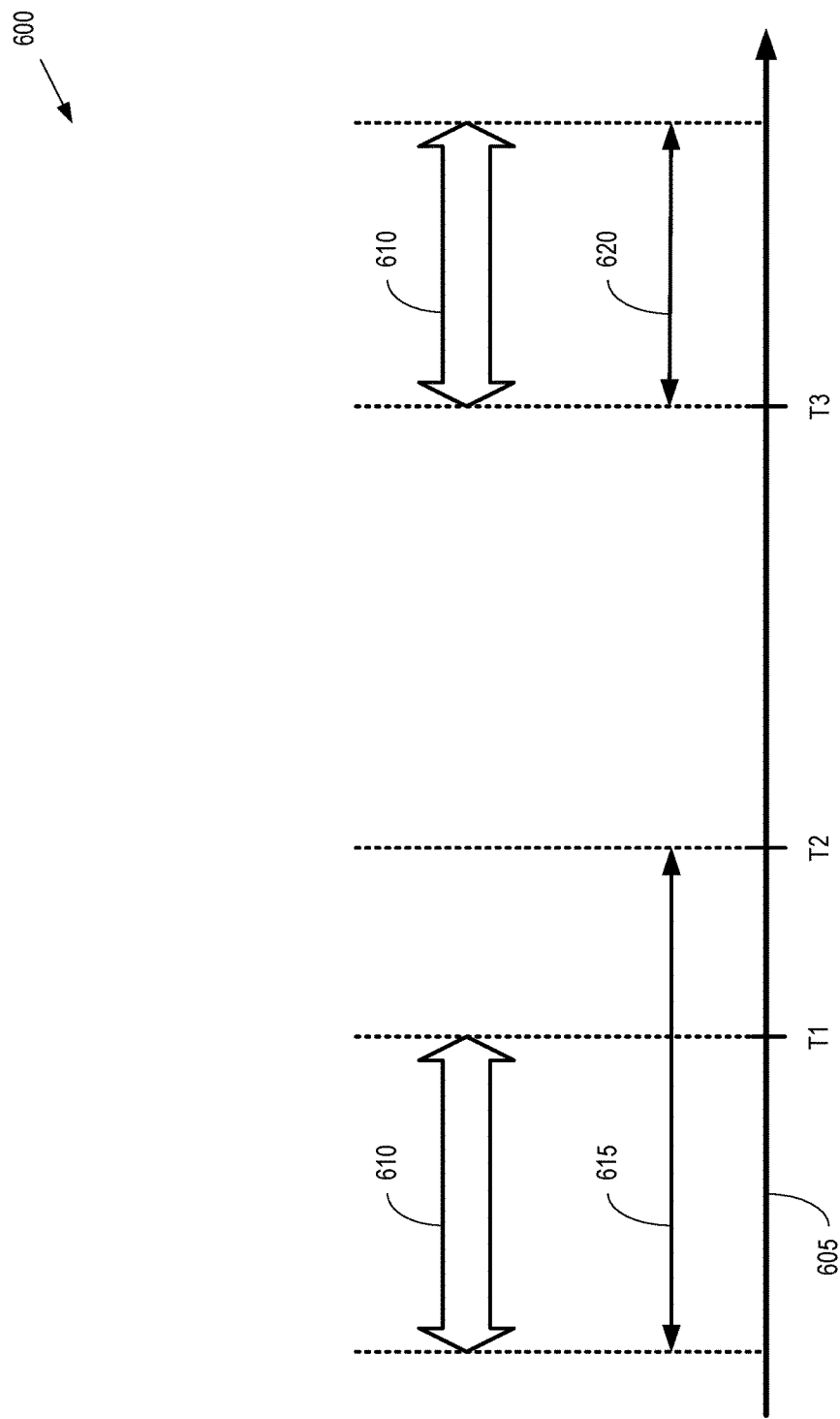
FIG. 6 is a timeline that indicates timing of an application layer interruption and a correlated radio bearer release event according to some embodiments.

FIG. 6 is a timeline 600 that indicates timing of an application layer interruption and a correlated radio bearer release event according to some embodiments. Time increases from left to right (in arbitrary units) on the axis 605. In the illustrated embodiment, the user equipment has established a radio bearer with a first base station and is engaged in an ongoing packet-switched application such as a VoLTE application.

At T<T1, the user equipment is transmitting or receiving RTP packets using the VoLTE application 610. The user equipment also has established the radio bearer at the signaling layer, as indicated by the double headed arrow 615. The radio bearer is terminated by a first base station.

At T=T1, an application layer monitoring module detects an interruption event in the RTP packets.

At T=T2, a signaling layer monitoring module detects release of a radio bearer that is used to support the VoLTE application for the user equipment.

At T=T3, the application layer monitoring module detects the end of the interruption event in the RTP packets.

At T>T3, the user equipment resumes transmitting or receiving RTP packets using the VoLTE application 610. The user equipment has also reestablished a radio bearer at the signaling layer, as indicated by the double headed arrow 620. In the illustrated embodiment, the reestablished radio bearer is terminated by a second base station, which may or may not be different than the first base station.

A correlation module can correlate the RTP interruption with the radio bearer release/modify events and generate actionable KPIs on the basis of the correlations. For example, the RTP interruption and the radio bearer release/modify events occurred during overlapping time intervals and are therefore highly correlated in time, which causes the correlation module to generate a correlation value above a threshold for the RTP interruption and the radio bearer release/modify events. The actionable KPIs can then be used to determine a cause of the RTP interruption. For example, if the first base station and the second base station are the same, the cause of the interruption can be due to a coverage hole or gap, a decrease in a signal-to-interference-plus-noise ratio for signals transmitted between the user equipment and the base station, an "around the corner" issue, and the like. For another example, if the first base station is different than the second base station the cause of the RTP interruption can be related to handoff issues, inconsistencies in the coverage areas of the first and second base stations, and the like. For another example, the RTP interruption can be caused by defects in devices for some device types, and the like.

Figure 7:
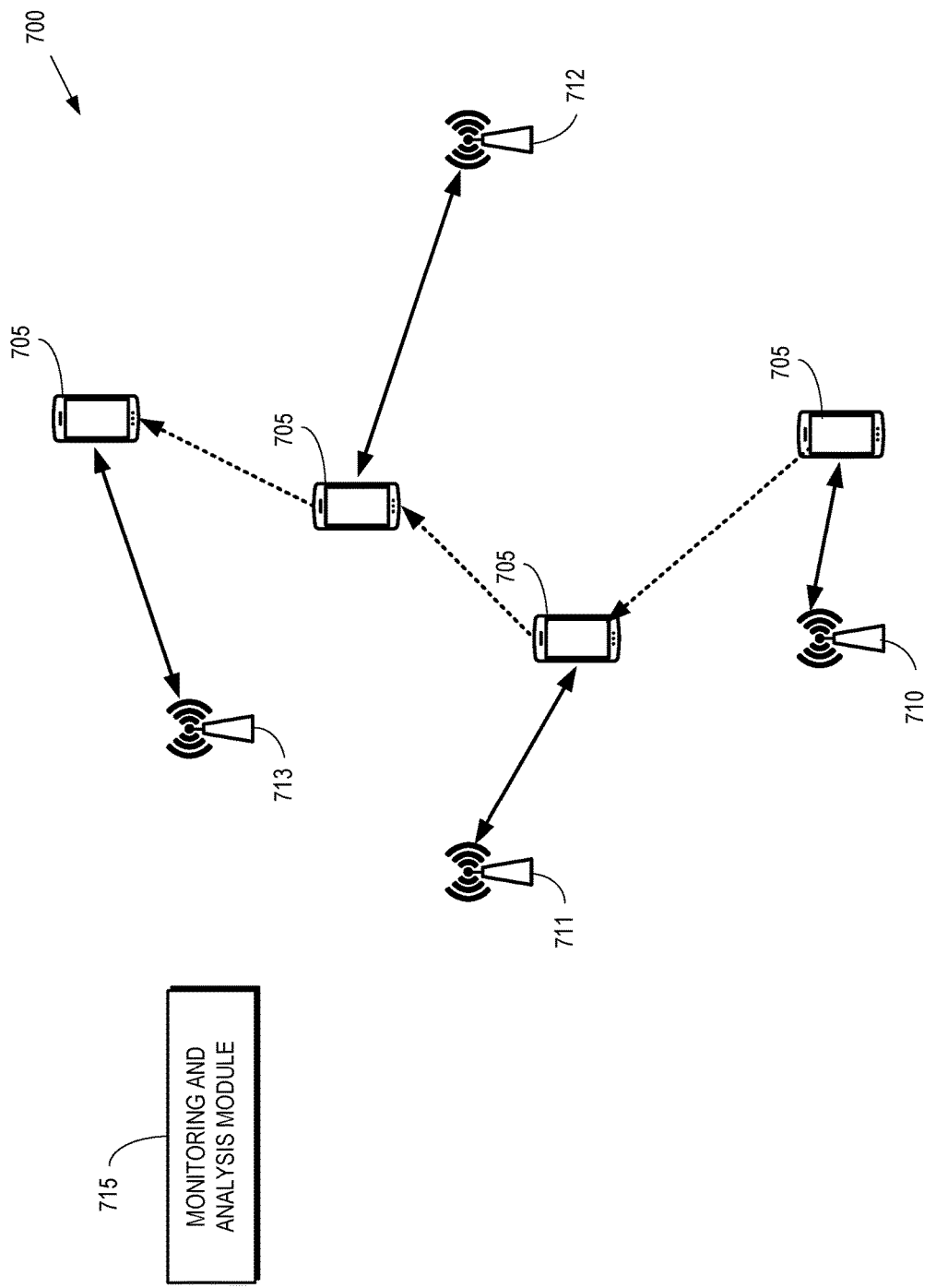
FIG. 7 is a diagram of a wireless communication system including a user equipment that hands off between different base stations according to some embodiments.

FIG. 7 is a diagram of a wireless communication system 700 including a user equipment 705 that hands off between different base stations 710, 711, 712, 713 according to some embodiments. The base stations 710, 711, 712, 713 are collectively referred to herein as "the base stations 710-713." The wireless communication system 700 implements some embodiments of the method 500 shown in FIG. 5. For example, the wireless communication system 700 can include a monitoring and analysis module 715 that operates in a manner similar to the monitoring and analysis module 400 shown in FIG. 4. In the interest of clarity, interconnections between the monitoring and analysis module 715 and the base stations 710-713 are not shown in FIG. 7.

Figure 8:
FIG. 8 illustrates real-time protocol (RTP) packet data and S11 signaling layer events that occur in the wireless communication system shown in FIG. 7 according to some embodiments.

The monitoring and analysis module 715 accesses information indicating application layer interruptions and signaling layer events. For example, the monitoring and analysis module 715 can access the information stored in the table shown in FIG. 8, which illustrates RTP packet data and S11 signaling layer events that occur in the wireless communication system 700. The first column in the table indicates the record type (RTP record or S11 record). For an RTP record, the second column indicates a time at which the first packet associated with the RTP record was received, the third column indicates a time in which the last packet associated with the RTP record was received, the fourth column indicates an uplink handover interruption time, the fifth column indicates a downlink handover interruption time, the sixth column indicates an uplink RTP packet loss rate, the seventh column indicates a downlink RTP packet loss rate, the eighth column indicates number of uplink RTP interruption events, the ninth column indicates number of uplink RTP interruption events, and the tenth column indicates the base station serving the user equipment during the time interval associated with the RTP record using the reference numerals for the base stations 710-713 shown in FIG. 7. For an S11 record, the second column indicates a time at which the S11 procedure requested, the third column indicates a time at which the S11 procedure responded, the fourth column indicates the S11 procedure type, and the tenth column indicates the base station serving the user equipment during the time interval associated with the S11 record using the reference numerals for the base stations 710-713 shown in FIG. 7.

Initially, the user equipment 705 is being served by the base station 710, as indicated by the RTP record for packets received between 06:07:26.233 and 06:07:58.913. The user equipment 705 hands over to the base station 711 in the time interval from 06:07:59.055 and 06:08:59.193 as indicated by the next RTP record. The user equipment 705 hands over to the base station 712 in the time interval from 06:08:59.213 and 06:09:28.790 as indicated by the next RTP record. A radio access bearer release occurs in the time interval 06:09:28.789 to 06:09:28.793 as indicated by the corresponding signaling layer event. Downlink data becomes available for the user equipment 705 in the time interval 06:09:28.855 to 06:09:28.861 as indicated by the corresponding signaling layer event. A bearer modify event occurs to indicate that a radio bearer has been established between the user equipment 705 and the base station 713 in the time interval 06:09:31.729 to 06:09:31.755 as indicated by the corresponding signaling layer event.

No audio was received by the user equipment 705 for more than three seconds, and was recorded in the RTP record for the time interval from 06:09:31.792 to 06:09:35.392. The RTP record for this time interval was generated because the time difference between last RTP packet received at the base station 712 and first RTP packet received at the base station 713 was more than 3 second. During this time interval, RTP packet loss also occurred. The uplink RTP packet loss rate was 51.7% and the downlink RTP packet loss was 27.4%, which indicates that an RTP interruption occurred during that time interval. Immediately after the radio bearer release, the downlink data notify event indicated that downlink data was still available for transmission to the user equipment, which indicated that the VoLTE application was active at the SIP layer. Nevertheless, more than three seconds transpired before the new radio bearer was established with the base station 713. The monitoring and analysis module 715 determines that the RTP interruption is highly correlated with the radio bearer release and reestablishment. The monitoring and analysis module 715 therefore generates an actionable KPI message that includes information indicating the RTP interruption event correlated with radio bearer release/modify signaling events involving the base stations 712, 713. The monitoring and analysis module 715 can also use the actionable KPI message to generate action recommendations. For example, the monitoring and analysis module 715 can generate a recommendation to down tile the base station 712.

Figure 9:
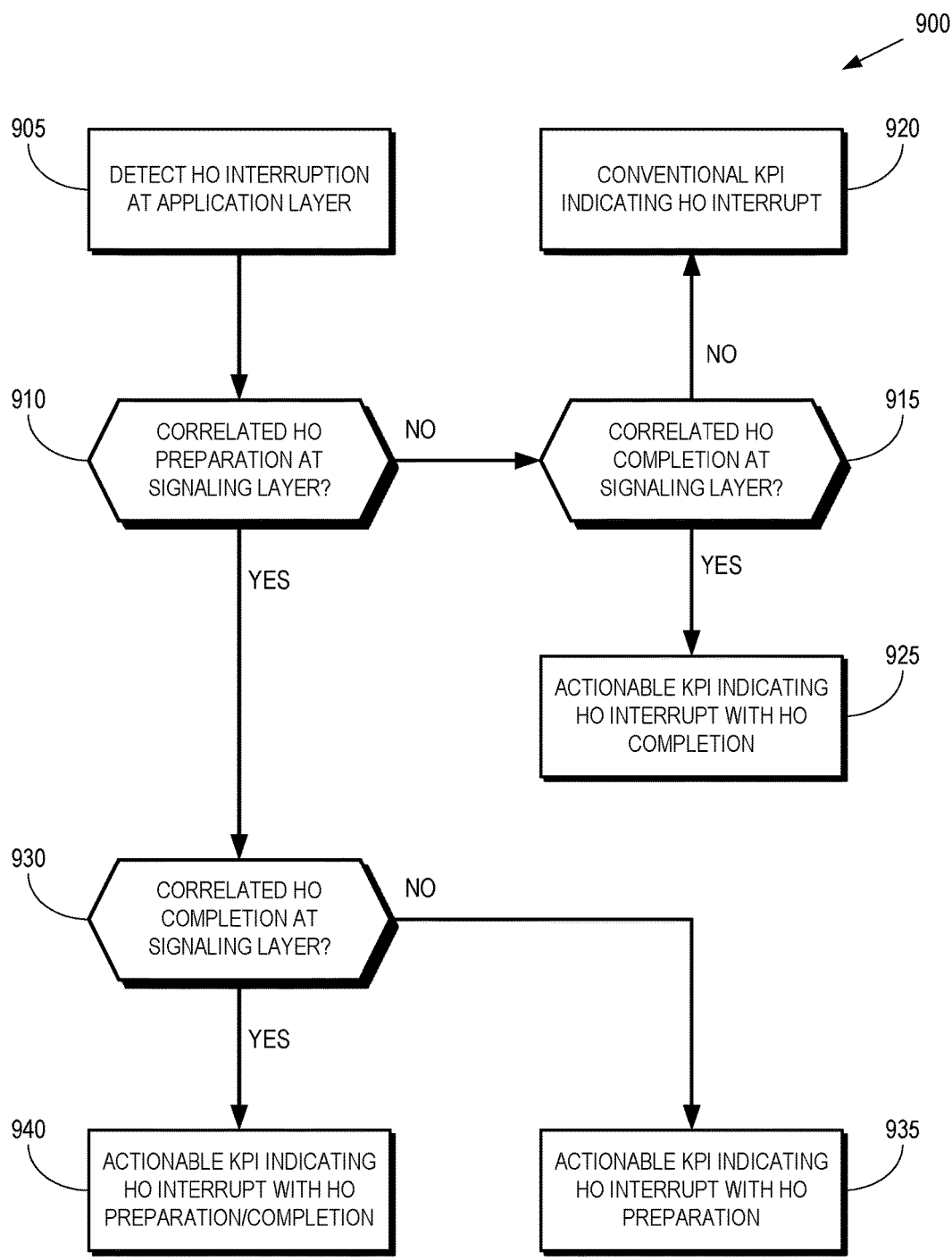
FIG. 9 is a flow diagram of a method for generating actionable KPIs based on application layer interruptions and correlated hand off events according to some embodiments.

FIG. 9 is a flow diagram of a method 900 for generating actionable KPIs based on application layer interruptions and correlated hand off events according to some embodiments. The method 900 is implemented in some embodiments of the correlation module 415 shown in FIG. 4.

At block 905, an application layer monitoring module in the correlation module detects a hand off interruption in a call that operates according to RTP. The interruption can be a call drop or the absence of audio for a time interval greater than a threshold time interval. The correlation module then correlates the detected interruption with signaling events that are monitored by a signaling layer monitoring module.

At decision block 910, the correlation module determines whether a signaling event indicating preparation for hand off the of the call from a source base station to a target base station is correlated with the application layer interruption. The X2 hand off preparation event can be detected using a cell trace (or X2 singling probe, or PCMD record) for signaling performed over an X2 interface between the source and target base stations. An S1 hand off preparation event can be detected by S1-AP signaling layer monitoring module for signaling performed over an S1 interface between the source base station and MME. If a correlated handoff preparation event is not detected, the method 900 flows to decision block 915. At decision block 915, the correlation module determines whether a handoff completion event for the call is correlated with the application layer interruption. The handoff completion event can be an S11 radio bearer modify event or an S1-AP path switch event. If not, the method 900 flows to block 920 and the correlation module generates a non-actionable KPI message that indicates the RTP interruption detected by the application layer monitoring module. The non-actionable KPI message does not include information indicating any signaling layer events. If a handoff completion event is detected at decision block 915, the method 900 flows to block 925 and the correlation module generates an actionable KPI message that includes information indicating the RTP interruption and information identifying the correlated handoff completion event. If the correlation module determines that a hand off preparation event is correlated with the application layer interruption, the method flows to decision block 930.

At decision block 930, the correlation module determines whether a handoff completion event for the call is correlated with the application layer interruption. The handoff completion event can be an S11 radio bearer modify event or an S1-AP path switch event. If not, the method 900 flows to block 935 and the correlation module generates an actionable KPI message that includes information indicating the RTP interruption and information identifying the correlated handoff preparation event. If so, the method 900 flows to block 940 and the correlation module generates an actionable KPI message that includes information indicating the RTP interruption and information identifying the correlated handoff preparation and completion events.

The actionable KPI message generated by the correlation module includes fields for information that identify the RTP interruption, (if detected) the handoff preparation event, and the handoff completion event. For example, the actionable KPI message can include fields identifying user equipment involved in the call, a timestamp indicating the last uplink or downlink RTP packet served by the source cell or base station, information identifying the source cell or base station, a timestamp indicating a time of the handoff preparation event, a timestamp indicating a time of the handoff completion event, a timestamp indicating the first uplink or downlink packet served by the target cell or base station, information identifying the target cell or base station serving the user equipment after the handoff completion event, and the like.

Figure 10:
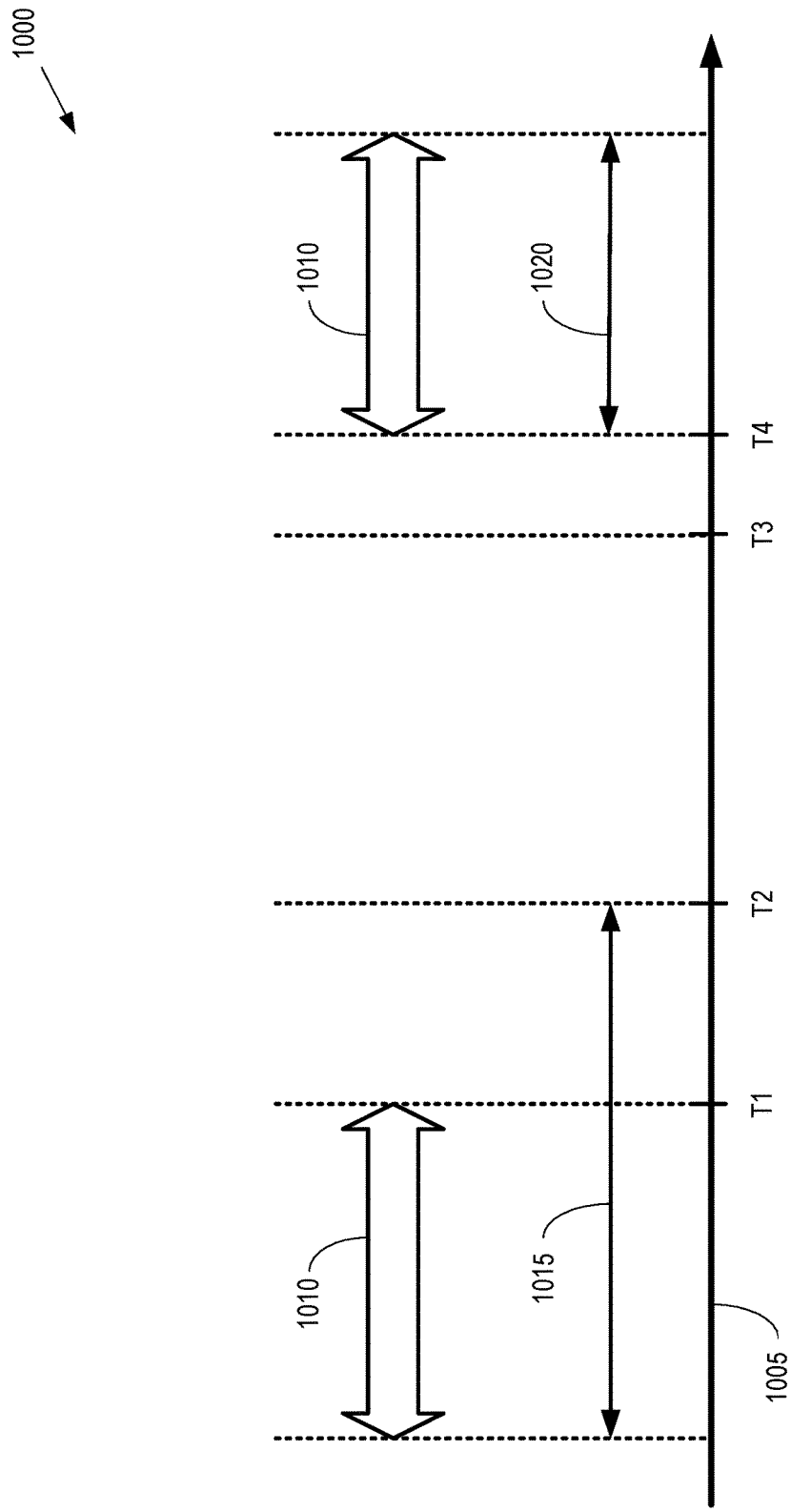
FIG. 10 is a timeline that indicates timing of an application layer interruption and correlated handoff preparation/completion events according to some embodiments.

FIG. 10 is a timeline 1000 that indicates timing of an application layer interruption and correlated handoff preparation/completion events according to some embodiments. Time increases from left to right (in arbitrary units) on the axis 1005. In the illustrated embodiment, the user equipment has established a radio bearer with a first base station and is engaged in an ongoing packet-switched application such as a VoLTE application.

At T<T1, the user equipment is transmitting or receiving RTP packets using the VoLTE application 1010. The user equipment also has established the radio bearer at the signaling layer, as indicated by the double headed arrow 1015.

At T=T1, an application layer monitoring module detects an interruption event in the RTP packets. For example, the application layer monitoring module can detect the last uplink or downlink RTP packet transmitted via the source base station.

At T=T2, a signaling layer monitoring module detects a handoff preparation event that initiates handoff of the user equipment from a source base station that is currently serving the user equipment.

At T=T3, the signaling layer monitoring module detects a handoff completion event that indicates completion of the handoff of the user equipment from the source base station to a target base station that is now the serving base station for the user equipment.

At T=T4, the application layer monitoring module detects the end of the interruption event in the RTP packets. For example, the application layer monitoring module can detect the first uplink or downlink RTP packet that is transmitted via the target base station. Some embodiments of the application layer monitoring module obtain information identifying the updated serving base station from the signaling layer monitoring module.

At T>T4, the user equipment resumes transmitting or receiving RTP packets using the VoLTE application 1010. The user equipment has also reestablished a radio bearer at the signaling layer, as indicated by the double headed arrow 1020. In the illustrated embodiment, the reestablished radio bearer is terminated by the target base station.

A correlation module can correlate the RTP interruption with the handoff preparation/completion events and generate actionable KPIs on the basis of the correlations. For example, the RTP interruption and the handoff preparation/completion events define overlapping time intervals and are therefore highly correlated in time, which causes the correlation module to generate a correlation value above a threshold for the RTP interruption and the handoff completion/preparation events. The actionable KPIs can then be used to determine a cause of the RTP interruption. For example, the RTP interruption can be caused by poor coverage in the location of the user equipment, defects in devices for some device types, and the like.

Figure 11:
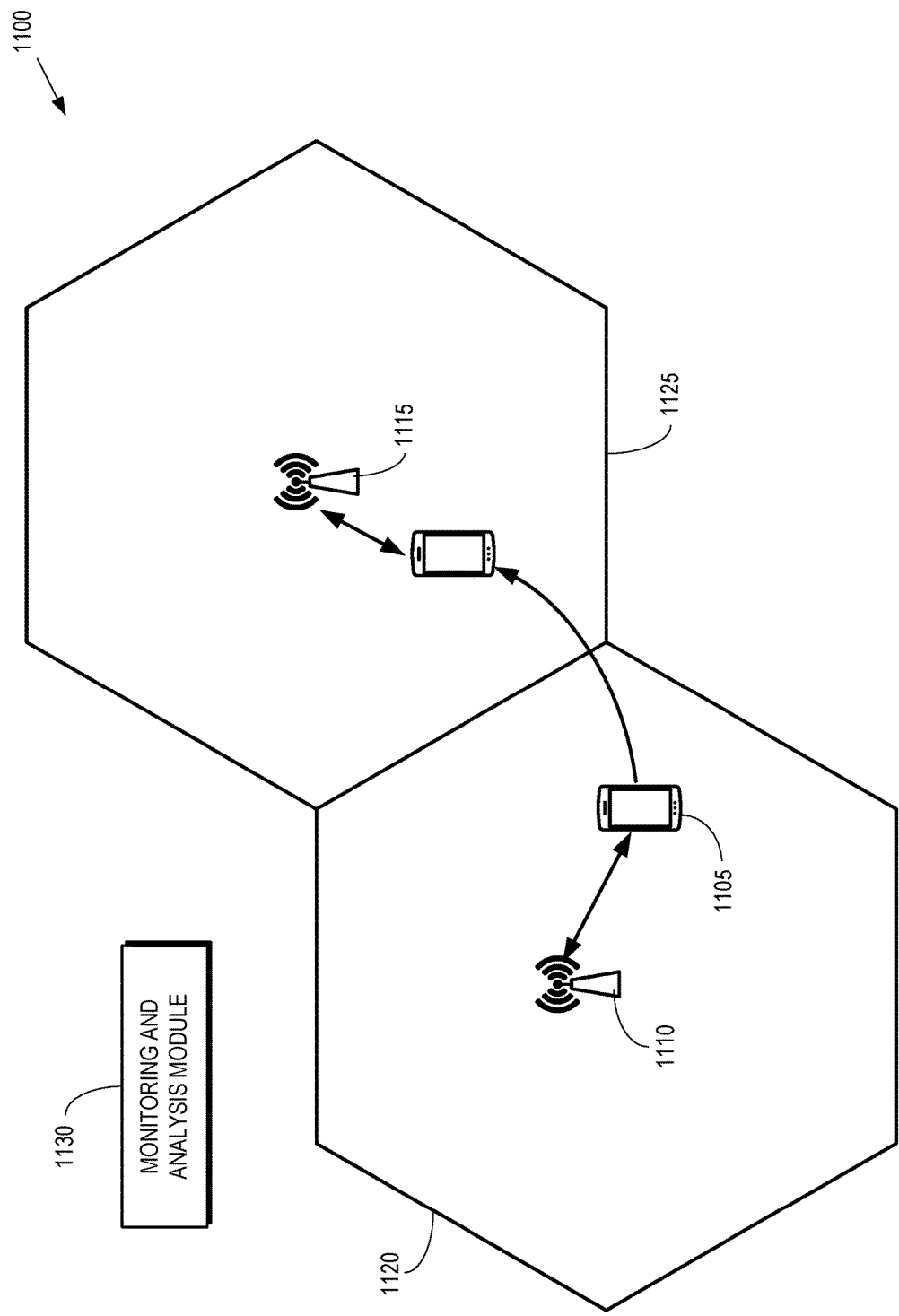
FIG. 11 is a diagram of a wireless communication system including a user equipment that hands off between base stations that serve adjacent cells according to some embodiments.

FIG. 11 is a diagram of a wireless communication system 1100 including a user equipment 1105 that hands off between base stations 1110, 1115 that serve adjacent cells 1120, 1125 according to some embodiments. The wireless communication system 1100 implements some embodiments of the method 900 shown in FIG. 9. For example, the wireless communication system 1100 can include a monitoring and analysis module 1130 that operates in accordance with the monitoring and analysis module 400 shown in FIG. 4. In the interest of clarity, interconnections between the monitoring and analysis module 1130 and the base stations 1110, 1115 are not shown in FIG. 7.

The monitoring and analysis module 1130 accesses information indicating application layer interruptions and signaling layer events. For example, the monitoring and analysis module 1130 can access the information stored in the table shown in FIG. 12, which illustrates RTP packet data and S11 signaling layer events that occur in the wireless communication system 1100. The first column in the table indicates the record type (RTP record or S11 record). For an RTP record, the second column indicates a time at which a first uplink media packet associated with the record was transmitted, the third column indicates a time at which a first downlink media packet associated with the record was transmitted, the fourth column indicates a time at which the last uplink media packet associated with the record was transmitted, the fifth column indicates a time at which the last downlink media packet associated with the record was transmitted, the sixth column indicates a duration of a uplink handover interruption time interval, the seventh column indicates a duration of a downlink handover interruption time interval, and the eighth column indicates the base station serving the user equipment during the time interval associated with the RTP record using the reference numerals for the base stations 1110, 1115 shown in FIG. 11. For an S11 record, the second column indicates a time at which the S11 procedure was requested, the third column indicates a time at which the S11 procedure responded, the fourth column indicates the S11 procedure type, and the eighth column indicates the base station serving the user equipment during the time interval associated with the S11 record using the reference numerals for the base stations 1110, 1115 shown in FIG. 11.

Initially, the user equipment 1105 is being served by the base station 1110, as indicated by the RTP record for uplink and downlink packets transmitted between 07:34:37.495 and 07:34:41.300. The user equipment 1105 hands over from the source base station 1110 to the target base station 1115 as indicated by the S11 record of the signaling event that indicates modification of an S1 bearer. The S11 modify bearer procedure took place from 07:34:41.336 to 07:34:41.362 indicating a completion of a handover. Following the handoff, the user equipment 1105 is served by the base station 1115, as indicated by the RTP record for uplink and downlink packets transmitted between 07:34:41.441 and 07:34:41.801.

The last uplink packet was received by the base station 1110 from the user equipment 1105 approximately 2.5 seconds before the handoff event, as indicated by the timestamp of 07:34:38.989 in the last uplink media column of the RTP record for the time interval from 07:34:37.495 to 07:34:41.300. This time interval corresponds to the uplink handover time of 2609 milliseconds indicated in the RTP record for the time interval from 07:34:41.441 to 07:34: 41.801. The monitoring and analysis module 1130 determines that the RTP interruption is highly correlated with the handoff event detected at the signaling layer. The monitoring and analysis module 1130 therefore generates an actionable KPI message that includes information indicating the RTP interruption event correlated with handoff signaling events involving the base stations 1110, 1115. The monitoring and analysis module 1130 can also use the actionable KPI message to generate action recommendations. For example, the monitoring and analysis module 1130 can generate a recommendation to adjust a handoff threshold used by one or more of the base stations 1110, 1115, adjust antenna tilt or transmission power at the base stations 1110, 1115, and the like.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
concurrently monitoring application layer packets for a call supported by a voice application and signaling layer events associated with the voice application;
in response to detecting an interruption in the call based on the monitoring of the application layer packets, correlating the interruption with the signaling layer events; and
generating a key performance indicator (KPI) message including information indicating the interruption and at least one signaling layer event that is correlated with the interruption.

2. The method of claim 1, wherein detecting the interruption comprises determining that the call has been dropped or that no audio has been provided for at least a threshold time interval.

3. The method of claim 1, wherein monitoring the signaling layer events comprises monitoring release, modification, or reestablishment of at least one radio bearer used to convey the application layer packets for the voice application.

4. The method of claim 1, wherein monitoring the signaling layer events comprises monitoring at least one of a handoff preparation event for the call, a handoff completion event for the call, a path switching event between two cells, or an event indicating handoff of the call to an incorrect cell.

5. The method of claim 1, wherein monitoring the signaling layer events comprises monitoring signaling layer events on at least one of a signaling interface between a base station and a mobility management entity (MME), a signaling interface between the MME and a gateway, or a packet interface between the base station and the gateway.

6. The method of claim 1, further comprising:
identifying the at least one signaling layer event as being correlated with the interruption in response to a value representing the correlation between the at least one signaling event and the interruption exceeding a threshold value.

7. The method of claim 1, wherein generating the KPI message comprises generating a KPI message including an identifier of user equipment involved in the call, timestamps indicating a beginning and an end of the interruption, information identifying the at least one signaling layer event, and timestamps indicating a beginning and an end of the at least one signaling layer event.

8. The method of claim 1, further comprising:
storing the KPI message in a data storage module; and
generating at least one of a corrective action to improve user experience at a network level, a corrective action associated with a device type of a user equipment involved in the call, or a corrective action to improve user experience of high-priority users based on the KPI message stored in the data storage module.

9. An apparatus comprising:
an application layer monitoring module configured to monitor application layer packets for a call supported by a voice application and to detect an interruption in the call based on the application layer packets;
a signaling layer monitoring module configured to monitor signaling layer events associated with the voice application concurrently with monitoring of the application layer packets for the call;
a correlation module configured to correlate the interruption with the signaling layer events in response to the application layer monitoring module detecting the interruption and generate a key performance indicator (KPI) message including information indicating the interruption and at least one signaling layer event that is correlated with the interruption, and
wherein each of the modules comprises a combination of hardware and software.

10. The apparatus of claim 9, wherein the application layer monitoring module is configured to detect the interruption by determining that the call has been dropped or that no audio has been provided for at least a threshold time interval.

11. The apparatus of claim 9, wherein the signaling layer monitoring module is configured to monitor release, modification, or reestablishment of at least one radio bearer used to convey the application layer packets for the voice application.

12. The apparatus of claim 9, wherein the signaling layer monitoring module is configured to monitor at least one of a handoff preparation event for the call, a handoff completion event for the call, a path switching event between two cells, or an event indicating handoff of the call to an incorrect cell.

13. The apparatus of claim 9, wherein the signaling layer monitoring module is configured to monitor signaling layer events on at least one of a signaling interface between a base station and a mobility management entity (MME), a signaling interface between the MME and a gateway, or a packet interface between the base station and the gateway.

14. The apparatus of claim 9, wherein the correlation module is configured to identify the at least one signaling layer event as being correlated with the interruption in response to a value representing the correlation between the at least one signaling event and the interruption exceeding a threshold value.

15. The apparatus of claim 9, wherein the application layer monitoring module is configured to generate a KPI message including an identifier of user equipment involved in the call, timestamps indicating a beginning and an end of the interruption, information identifying the at least one signaling layer event, and timestamps indicating a beginning and an end of the at least one signaling layer event.

16. The apparatus of claim 9, further comprising:
a data storage module configured to store the KPI message in a data storage; and
an analysis module configured to generate at least one of a corrective action to improve user experience at a network level, a corrective action associated with a device type of a user equipment involved in the call, or a corrective action to improve user experience of high-priority users based on the KPI message stored in the data storage module.

17. An apparatus, comprising:
a monitoring module configured to concurrently monitor application layer packets and signaling layer events;
a correlation module configured to selectively generate an actionable KPI message that includes information indicating an interruption in a call detected based on the application layer packets and at least one signaling event or a non-actionable KPI message that includes information indicating the information and no information indicating the at least one signaling event based on a degree of correlation between the interruption and the at least one signaling event, and
wherein each of the modules comprises a combination of hardware and software.

18. The apparatus of claim 17, wherein the monitoring module is configured to detect the interruption by determining that the call has been dropped or that no audio has been provided for at least a threshold time interval.

19. The apparatus of claim 17, wherein the monitoring module is configured to monitor signaling layer events on at least one of a signaling interface between a base station and a mobility management entity (MME), a signaling interface between the MME and a gateway, or a packet interface between the base station and the gateway.

20. The apparatus of claim 17, wherein the correlation module is configured to identify the at least one signaling layer event as being correlated with the interruption in response to a value representing the correlation between the at least one signaling event and the interruption exceeding a threshold value.

* * * * *